United States Patent [19]
Ellis et al.

[11] 4,122,923
[45] Oct. 31, 1978

[54] ADJUSTABLE HYDRAULIC SHOCK ABSORBER

[75] Inventors: Larry C. Ellis, Farmington Hills; John S. Ellis, Union Lake; Russell N. Cossin, South Lyon, all of Mich.

[73] Assignee: Ace Controls, Inc., Farmington, Mich.

[21] Appl. No.: 814,167

[22] Filed: Jul. 11, 1977

[51] Int. Cl.² .............................................. F16F 9/342
[52] U.S. Cl. ........................................ 188/285; 188/315
[58] Field of Search ............... 188/269, 285, 286, 288, 188/298, 299, 313, 315, 319; 267/34, 64 R, 65 B, 127

[56] References Cited

U.S. PATENT DOCUMENTS

| | | | |
|---|---|---|---|
| 310,129 | 12/1884 | Forrest et al. | 188/285 UX |
| 3,027,152 | 3/1962 | Deschner | 267/127 |
| 3,666,256 | 5/1972 | Ellis et al. | 188/315 X |
| 3,918,693 | 11/1975 | Zahid | 188/298 X |
| 3,990,548 | 11/1976 | Schupner | 188/313 |

*Primary Examiner*—Duane A. Reger
*Attorney, Agent, or Firm*—Robert G. Mentag

[57] ABSTRACT

An adjustable hydraulic shock absorber of the dashpot type which includes an elongated outer tube and an inner tube fixed in said outer tube. A piston is movably mounted in the inner tube and has a piston rod extended outwardly of the outer tube for receiving reciprocating actuating loads. A double action, flexible, tubular diaphragm is positioned in the outer tube, with its inner end secured to the outer tube in a position surrounding one end of the inner tube, and with its outer end secured to the piston rod, so as to form an expandable fluid reservoir. The reservoir is connected by passageway means to the inner tube. The reservoir, passageway means and inner tube are normally filled with fluid under pressure so as to normally move the piston to an initial load receiving position. An adjustable, combination check valve and metering valve means is mounted in the fluid passageway means for providing a controlled flow of fluid from the inner tube to the reservoir when a load is received by the piston rod to move the piston into the inner tube, and to allow a free flow of fluid back from the reservoir to the piston cylinder after the load is removed and to move the piston back to its initial position.

10 Claims, 2 Drawing Figures

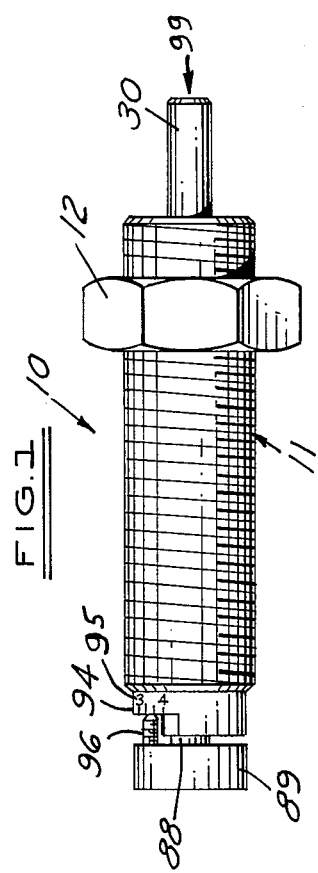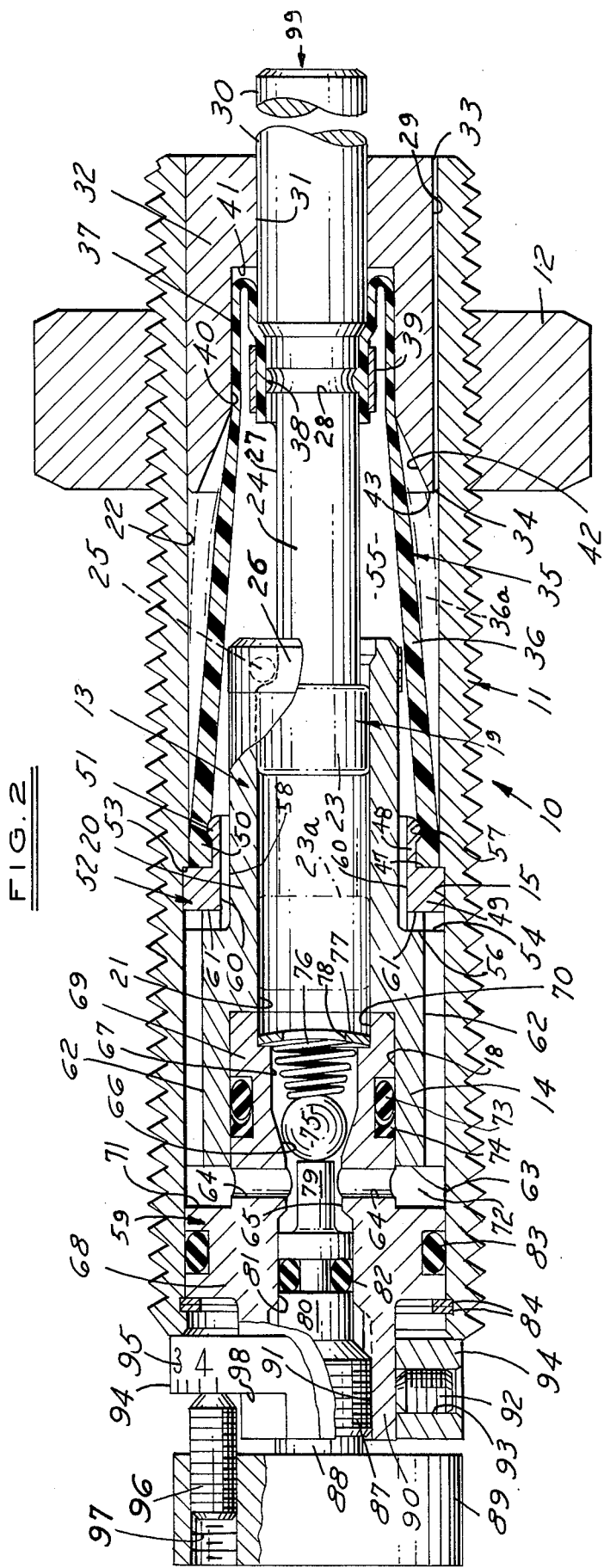

ADJUSTABLE HYDRAULIC SHOCK ABSORBER

BACKGROUND OF THE INVENTION

1. Field of the Invention

This invention relates generally to shock absorbers, and more particularly, to an improved adjustable hydraulic shock absorber of the dashpot type. The adjustable shock absorber of the present invention is adapted for many uses, as for example, for controlling the movement of various machine mechanisms and absorbing vibrations of varying quantities of kinetic energy.

2. Description of the Prior Art

It is known in the hydraulic dashpot art to provide a pressure tube filled with fluid, and to have a piston slidably mounted therein which carries a piston rod for receiving impact loads. Heretofore, certain prior art hydraulic dashpots have been provided with an internally mounted diaphragm means for forming a reservoir to receive fluid and expand under pressure during an impact load absorbing operation and to contract and force fluid back to the pressure tube after the impact load is removed, and to return the piston to its initial load receiving position. However, such prior art dashpots are not simple and compact in construction, nor are they economical to manufacture. They require separate metering valve means and check valve means, and separate passageways for controlling the flow of fluid between the pressure tube and the reservoir. A disadvantage of the other prior art hydraulic dashpots is that they require a return spring for returning the piston to its initial starting position after the impact load is removed. A further disadvantage of the prior art dash pots is that the fine metering orifices employed tend to clog up.

SUMMARY OF THE INVENTION

The adjustable hydraulic shock absorber of the present invention comprises an elongated outer tube having an open forward end and an open rearward end. An inner pressure tube is fixedly mounted in the outer tube, and it has a reduced diameter end that is forwardly extended in the outer tube. A piston cylinder is formed in the inner pressure tube and has a piston slidably mounted therein. The piston is provided with a piston rod that extends through the open forward end of the inner pressure tube and out of the outer tube. A bearing member is mounted in the forward end of the outer tube for slidably supporting the piston rod.

A double action, flexible, tubular diaphragm is positioned in the outer tube with its inner end secured to the outer tube and in a position surrounding the forward end of the inner pressure tube, and with its outer end secured to the piston rod so as to form an expandable fluid reservoir. An inner tube retainer is mounted in the rearward end of the outer tube for holding the inner pressure tube in place. Passageway means interconnect the piston cylinder and the fluid reservoir. The passageway means, piston cylinder and fluid reservoir are filled with fluid under pressure to normally move the piston to the forward end of the piston cylinder and the piston rod to an initial impact load receiving position. A combination check valve and metering valve means is operatively mounted in said fluid passageway means for metering the flow of fluid from the piston cylinder to the reservoir when the piston is moved inwardly of the piston cylinder under a load, and to allow a free flow of fluid from the reservoir back to the cylinder when the load on the piston is removed. Adjustment means is provided for adjusting the combination valve means for controlling the metering action of the same.

BRIEF DESCRIPTION OF THE DRAWING

FIG. 1 is a side elevation view of an adjustable shock absorber made in accordance with the principles of the present invention.

FIG. 2 is an enlarged, longitudinal view of the adjustable shock absorber illustrated in FIG. 1, shown with parts removed and broken away, and parts in longitudinal section.

DESCRIPTION OF THE PREFERRED EMBODIMENT

Referring now to the drawings, and in particular to FIG. 1, the numeral 10 generally designates a cylindrical outer tube or housing which is threaded on the outer cylindrical surface thereof, for threadably fixing the outer tube 10 in an operative position in a supporting structure. The numeral 12 designates a lock nut which is threadably mounted on the threaded outer surface of the outer tube 11 for fixing the shock absorber in an operative position in a supporting structure. As shown in FIG. 2, the outer tube or housing 11 is provided with a longitudinal bore that extends completely therethrough, and which comprises the rear end portion 15 and the reduced diameter front end portion 22.

As shown in FIG. 2, an inner tube assembly, generally indicated by the numeral 13, is slidably mounted in the rear end of the outer housing 11. The inner tube 13 includes an enlarged diameter rear end portion 14 which is slidably mounted in the rear bore portion 15 of the outer tube or housing 11. The inner tube 13 includes an integral, reduced diameter front end portion 20 which extends forwardly into the reduced diameter bore or chamber 22 in the front end of the outer tube or housing 11. The inner tube 13 is provided with a central piston cylinder or bore 21 which extends inwardly from the front end thereof and terminates at the front end of a communicating larger diameter bore 18 that is formed in the inner tube rear end portion 14. The numeral 19, in FIG. 2, generally designates a piston assembly which has a piston head 23 that is slidably mounted in the piston cylinder 21 in the inner tube portion 20. The piston assembly 19 further includes an inner piston rod portion 24 which has its inner end integrally attached to the piston 23 and its outer end integrally attached to an outer piston rod portion 30. As shown in FIG. 2, the piston rod outer end portion 30 is formed to a larger diameter than the piston rod inner end portion 24. The piston head 23 is retained in the piston cylinder 21 and against rotation by a transverse retainer pin 25 which slidably engages a flat 27 formed along the piston rod portion 24. The retainer pin 25 is secured in position in a suitable bore in the outer end of the inner tube portion 20 by any suitable means, as by a suitable tape means 26 which is fixed around the outer periphery of the outer end of the inner tube portion 20.

As shown in FIG. 2, the front end of the outer tube or housing 11 is enclosed by a cylindrical bearing member 32 which is fixed in position into the front end of the outer tube bore 22 by any suitable means, as by a suitable adhesive. The piston rod outer end portion 30 is slidably mounted through a central bore 31 formed through the front end of the bearing member 32. The rear end of the bore 31 communicates with an enlarged diameter bore 40, and the inner end of the enlarged bore 40 communicates with the inner end of a tapered bore 42 that terminates at the inner end 43 of the bearing member 32. The junction between the rear end of the bore 31 and the bore 40 forms a transverse shoulder 41. The bearing member 32 is provided on its periphery with a longitudinally extended flat portion 29 which is made to a dimension of about 0.010 inch. The front end of the longitudinal flat portion 29 is indicated by the numeral 33 in FIG. 2 and its rear end by the numeral 34. The flat portion 29 on the bearing member 32 provides a passageway between the exterior of the outer tube or housing 11 and the housing bore 22.

As shown in FIG. 2, the numeral 35 generally designates a cylindrical diaphragm member which forms an expandable wall or boundary for a fluid accumulator or reservoir. The diaphragm 35 functions with the adjacent structure to form a variable volume reservoir which contains a suitable shock absorber fluid, the front end of the inner tube 13, the piston rod portion 24 and a part of the piston rod portion 30. The diaphragm 35 is made from any suitable elastomeric material and comprises two integral resilient or yieldable portions 36 and 37. The inner end portion 36 has a thick wall surface to form a body portion. The outer end portion 37 of the diaphragm 35 is made with a thinner wall thickness to permit rolling action thereof and movement of the piston rod portions 24 and 30. The diaphragm outer end portion 37 forms a convolution which has its free end mounted along the inner end of the piston rod portion 30 and the adjoining outer end of the piston rod portion 24. An internal, integral, cylindrical rib 31 is formed on the inner surface of the free end of the diaphragm portion 37, and it is seated in a mating groove 28 formed in the outer periphery of the piston rod portion 24. The diaphragm portion 37 is secured to the piston rod portions 24 and 30 by any suitable means, as by a suitable tape 39.

As shown in FIG. 2, the diaphragm body portion 36 is provided with a radial inwardly extended inner end portion 50 which is fixed in the outer tube or housing 11 by a cylindrical retainer member, generally designated by the numeral 52. The diaphragm retainer member 52 includes a cylindrical body portion 49 which is slidably mounted in the outer tube rear end bore portion 15. The diaphragm retainer 52 includes an axially extended sleeve portion 48 which is formed integral with the front face of the retainer body portion 49 and which forms a shoulder 47 with the body portion 49. The sleeve portion 48 has its outer ends seated against the shoulder 53 that is formed at the junction of the outer tube bores 15 and 22. A radial, peripheral rib 51 is formed on the outer end of the retainer sleeve portion 48 for engagement with an internal peripheral groove 57 in the diaphragm body portion 36, adjacent the front edge of the inwardly extended flange 50 on the inner end of the diaphragm body portion 36. It will be seen that the inner end of the diaphragm body portion 36 is retained by the aforedescribed structure in a fixed and sealed position in the outer tube or housing 11. A reservoir or accumulator 55 is formed by the space or volumetric area inside of the diaphragm 35. A shoulder 54 is formed on the inner tube 13, at the junction between the enlarged diameter portion 14 and the front end portion 20. The rear face 56 of the diaphragm retainer 52 is seated against the shoulder 54 for holding the retainer 52 in place against the shoulder 53 on the outer tube 11.

As shown in FIG. 2, the diaphragm retainer 52 is provided with a cylindrical axial bore 58 through which is received the reduced diameter portion 20 of the inner tube 13. A pair of diametrically disposed, longitudinal grooves 60 are formed in the surface of the bore 58 in the diaphragm retainer 52. The front end of each of the diametrically disposed grooves 60 communicates with the reservoir 55. The rear end of each of the longitudinal grooves 60 communicates with the inner end of one of a pair of transverse or radial grooves 61 which are formed in the rear transverse face 56 of the diaphragm retainer 52. The outer end of each of the transverse grooves 61 communicates with the front end of one of an adjacent, longitudinally extended groove 62. The longitudinal grooves 62 are diametrically formed in the outer periphery of the inner tube enlarged diameter portion 14. The rear end of each of the longitudinal grooves 62 communicates with an annular groove 72 formed between rear face 63 of the inner tube portion 14 and the front face 71 of the center portion 68 of the inner tube retainer, generally indicated by the numeral 59.

The inner tube retainer 59 includes the cylindrical center portion 68 which has an outer diameter of a size so that it is slidably mounted in the bore 15 in the rear end of the outer tube 11. The inner tube retainer 59 further includes an integral reduced diameter, cylindrical front end portion 69 which is slidably mounted in the bore 18 formed in the rear end of the inner tube rear portion 14. The inner tube retainer 59 retains the inner tube 13 in operative position in the outer tube 11, and it is held in place by a pair of releasable retainer clip rings 84.

As shown in FIG. 2, the groove 72 communicates with a pair of transverse or radial bores 64 which are formed in the cylindrical front end portion 69 of the inner tube retainer 59. The inner ends of the bores 64 communicate with an axial bore 65 which is formed through the inner tube retainer portion 69. The front end of the bore 65 communicates with a diverging, tapered bore 66 which in turn communicates with an axial bore 67. The front end of the bore 67 communicates with an enlarged diameter axial bore 70 which communicates with the piston cylinder 21 in the inner tube front end portion 20. A suitable O-ring 73 is mounted in a groove around the periphery of the front end portion 69 of the inner tube retainer 59 for sealing engagement with the wall of the bore 18 in the inner tube rear portion 14. A suitable back-up sealing ring 74 is also mounted in the same groove behind the O-ring 73.

A ball check valve 75 is mounted in the tapered bore 66 which forms a tapered seat for the ball check valve 75. A suitable spring 76 is mounted in the bore 67, and normally biases the ball check valve 75 to the left, as viewed in FIG. 2, into an operative metering relationship with the valve seat 66. A suitable retainer plate 77 is mounted in the bore 70, in the front end portion 69 of the inner tube retainer 59, for retaining the spring 76 in place. The retainer plate 77 may be held in position by any suitable means, as by a friction fit. The retainer plate 77 has a passage 78 formed therethrough for passage of fluid. An adjusting needle 79 in the form of a cylindrical shaft is movably mounted in the axial bore 65 for engagement with the ball check valve 75 for adjusting the same in spaced relation from the seat 66. The adjusting needle 79 is integrally connected to a cylindrical shaft 80 that is slidably mounted in an enlarged diameter bore 81 that communicates at its forward end with the bore 65. A suitable O-ring 82 is mounted in a groove around the periphery of the needle shaft 80. A suitable O-ring 83 is also mounted around the periphery of the center portion 68 of the inner tube retainer 59.

The following described structure provides a means for moving the adjusting needle 79 inwardly and outwardly for adjusting the position of the ball check metering valve 75. As shown in FIG. 2, an enlarged diameter, threaded shaft 87 is integrally connected to the needle shaft 80, and it is threadably mounted in a threaded bore 91 that is formed in an integral sleeve shaft 90 which is formed on the rear end of the center portion 68 of the inner tube retainer 59. The internally threaded sleeve shaft 90 is made to a smaller diameter than the center portion 68 of the inner tube retainer 59, and it has mounted therearound a collar or indicia sleeve 94 which carries suitable calibration indicia 95. The indicia collar or sleeve 94 is releasably secured in position on the sleeve shaft 90 by any suitable means, as by a set screw 92 which is threadably mounted in a threaded bore 93 formed radially in the indicia sleeve 94.

A reduced diameter shaft 88 is integrally connected to the outer end of the threaded shaft 87. Integrally attached to the shaft 88 is an enlarged diameter knob 89 for manually adjusting the adjusting needle 79. The adjusting knob 89 is provided adjacent the outer periphery thereof with a threaded bore 97 through which is threadably mounted a set screw 96. The screw 96 has its outer pointed end extended forwardly into a cut-away portion 98 formed in the rear end of the indicia sleeve 94. It will be understood that the set screw 96 is used to indicate the position of the adjusting needle 79 relative to the calibration indicia 95. The set screw is also threadable inwardly into locking engagement with the indicia sleeve 94 for locking the adjusting needle 79 in a desired adjusted position.

In use, a vacuum is applied to the area exterior of the diaphragm 35, through the passageway formed by the flat surface 29 on the bearing member 32. With the adjusting needle 79 removed, a suitable hydraulic shock absorber fluid is forced into the piston cylinder 21 and through the bore 64, the groove 72, the grooves 62, 61 and 60 into the accumulator 55, so as to completely fill all of the last described volumetric areas in the shock absorber. The adjusting needle 79 is then assembled to the outer tube 11. It will be understood that the hydraulic fluid is inserted into the shock absorber under pressure, and that after the adjusting needle 79 is applied, that the hydraulic fluid inside of the shock absorber is under pressure and the diaphragm 35 is under an initial pressure and is expanded to the solid line position shown in FIG. 2.

FIG. 2 shows the shock absorber 10 with the plunger or piston rod portions 24 and 30 in extended position at the start of a working stroke. When an external load is applied to the outer end of the piston rod 30, as shown by the arrow 99, the piston moves inwardly or to the left, as viewed in FIG. 2, to the position 23a, and the fluid within the piston cylinder 21 is pressurized so as to cause a reaction force opposite to said load. The fluid from the piston cylinder 21 flows to the left, as viewed in FIG. 2, through the bores 70, 67, and 66, and past the ball check metering valve 75. The ball check metering valve 75 is shown in an adjusted position, slightly off of the valve seat 66. It will be understood that the ball check metering valve 75 would be adjusted relative to the valve seat 66 in accordance with the desired speed controling action. The fluid flows or escapes past the ball check metering valve 75 at a steady rate through the bores 65 and 64, the grooves 72, 62, 61 and 60, and then into the reservoir or accumulator 55, to control the speed of the load at a steady rate. The escaping fluid is forced against the initial reserve pressure of the fluid in the shock absorber, and when the additional fluid is forced into the reservoir 55, the diaphragm body portion 36 is expanded outwardly to the dotted line position shown by numeral 36a in FIG. 2. It will be understood that the thinner wall diaphragm front end portion 37 permits the front end of the diaphragm 35 to be rolled axially to permit reciprocation of the piston rod portions 24 ad 30. During expansion of the diaphragm 35, the air exterior to the diaphragm inside of the outer tube 11, is exhausted through the passageway formed by the flattened portion 29 on the bearing member 32. After the load is moved from the piston rod outer end portion 30, the stretched flexible diaphragm 35 returns to its original full line position shown in FIG. 2, and forces the fluid which was received from the piston cylinder 21 back into said cylinder 21. The last mentioned action returns the piston 23 to the initial full line position shown in FIG. 2. The last mentioned function of the diaphragm 35 is effected by the reserve pressure which is originally exerted on the diaphragm when the shock absorber is loaded with fluid under pressure, and also by the potential energy which is accumulated by the expansible diaphragm 35 during an inward stroke of the piston 23 from its full line position shown in FIG. 2 to an advanced inward position as indicated by the numeral 23a.

It will be seen that the shock absorber can be calibrated in accordance with the position of the ball check metering valve 75 relative to the seat 66 to provide a device for controlling the speed of a moving load at a desired steady rate.

It will also be seen that the structure of the ball check metering valve 75, and fluid flow passages, provides a combination check valve and metering system, with a self-washing characteristic. The radial clearance around the ball check metering valve 75, relative to the tapered seat 66, provides a metering orifice which is self-cleaned when the fluid flows back from the accumulator 55 into the piston cylinder 21. It will be seen that the ball check metering valve 75 provides a metering action for speed control when the piston 23 is moved inwardly under a moving load, and that it allows a free flow of fluid from the accumulator 55 back to the piston cylinder 21 when the load is moved from the piston 23. The shock absorber of the present invention is simple and may be made to a small size. The economical manufacturing costs of the shock absorber 10 permits it to be made either in a repairable model, or in a less expensive throwaway model.

While it will be apparent that the preferred embodiment of the invention herein disclosed is well calculated to fulfill the objects above stated, it will be appreciated that the invention is susceptible to modification, variation and change.

What is claimed is:

1. An adjustable hydraulic shock absorber comprising:
   (a) an elongated housing;
   (b) a piston cylinder carried in said housing;
   (c) a piston movably mounted in said piston cylinder, and having a piston rod extended out of one end of the housing to receive impact loads, and having a continuous inner end with no passageways through the piston;

(d) a double action flexible, tubular diaphragm positioned in said housing with an inner end secured to the housing and with an outer end secured to the piston rod to form an expandable fluid reservoir;

(e) two-directional fluid passageway means interconnecting said piston cylinder for alternate flow of fluid from the piston cylinder to the fluid reservoir during a shock absorbing operation and then back from the fluid reservoir to the piston cylinder, and including a valve seat means, and said fluid passageway means, piston cylinder and fluid reservoir being filled with fluid under pressure to normally move the piston to one end of the piston cylinder in an initial loading receiving position;

(f) a combination check valve and metering valve means operatively mounted in said fluid passageway means for operation with said valve seat means for metering the flow of fluid from the piston cylinder to the reservoir when the piston is moved inwardly of the piston cylinder under a load, and to allow a free flow of fluid through said fluid passageway means from the reservoir back to the piston cylinder when the load on the piston is removed; and, (g) means for adjusting the combination valve means for controlling the metering action of the same, whereby when a load is exerted on the piston rod, the piston is moved inwardly of the piston cylinder to force the fluid in the piston cylinder past the valve means in a metering action and through said passageway means into the reservoir means and said diaphragm is expanded and the speed of the load is controlled, and when the load is removed from the piston rod, the diaphragm contracts to return fluid from the reservoir through the passageway means and past the valve means in a free flow action into the piston cylinder to return the piston to its initial load receiving position.

2. An adjustable hydraulic shock absorber as defined in claim 1, wherein said combination check valve and metering valve means includes:

(a) a valve member mounted in said passageway means in operative relationship to said valve seat means; and, (b) biasing means for normally biasing said valve member into engagement with said means for adjusting the valve means, to provide a fluid metering passage between the valve seat means and the valve member when the piston is moved inwardly of the piston cylinder to meter the fluid flowing from the piston cylinder into the reservoir, and to allow the valve member to be moved by fluid under pressure to a position spaced apart from the valve seat means to allow a free flow of fluid from the reservoir into the piston cylinder when an impact load is removed from the piston rod.

3. An adjustable hydraulic shock absorber as defined in claim 2, wherein:

(a) said biasing means comprises a spring means.

4. An adjustable hydraulic shock absorber as defined in claim 3, wherein:

(a) said valve member comprises a ball type valve member.

5. An adjustable hydraulic shock absorber as defined in claim 2, wherein:

(a) said means for adjusting the combination valve means includes an adjusting needle means.

6. An adjustable hydraulic shock absorber as defined in claim 5, wherein:

(a) said means for adjusting the combination valve means includes means for holding the adjusting needle means in an adjusted position.

7. An adjustable hydraulic shock absorber as defined in claim 2 wherein:

(a) said elongated housing comprises an outer tube and said piston chamber is formed in a separate inner tube that is fixedly mounted in the outer tube.

8. An adjustable hydraulic shock absorber as defined in claim 7, including:

(a) an inner tube retainer mounted in said outer tube for holding the inner tube in an operative position in the outer tube.

9. An adjustable hydraulic shock absorber as defined in claim 8, including:

(a) a diaphragm retainer member for securing the inner end of the diaphragm to the outer tube.

10. An adjustable hydraulic shock absorber as defined in claim 9, wherein:

(a) said fluid passageway means are formed through said inner tube, inner tube retainer and said diaphragm retainer member.

* * * * *